Patented Aug. 4, 1925.

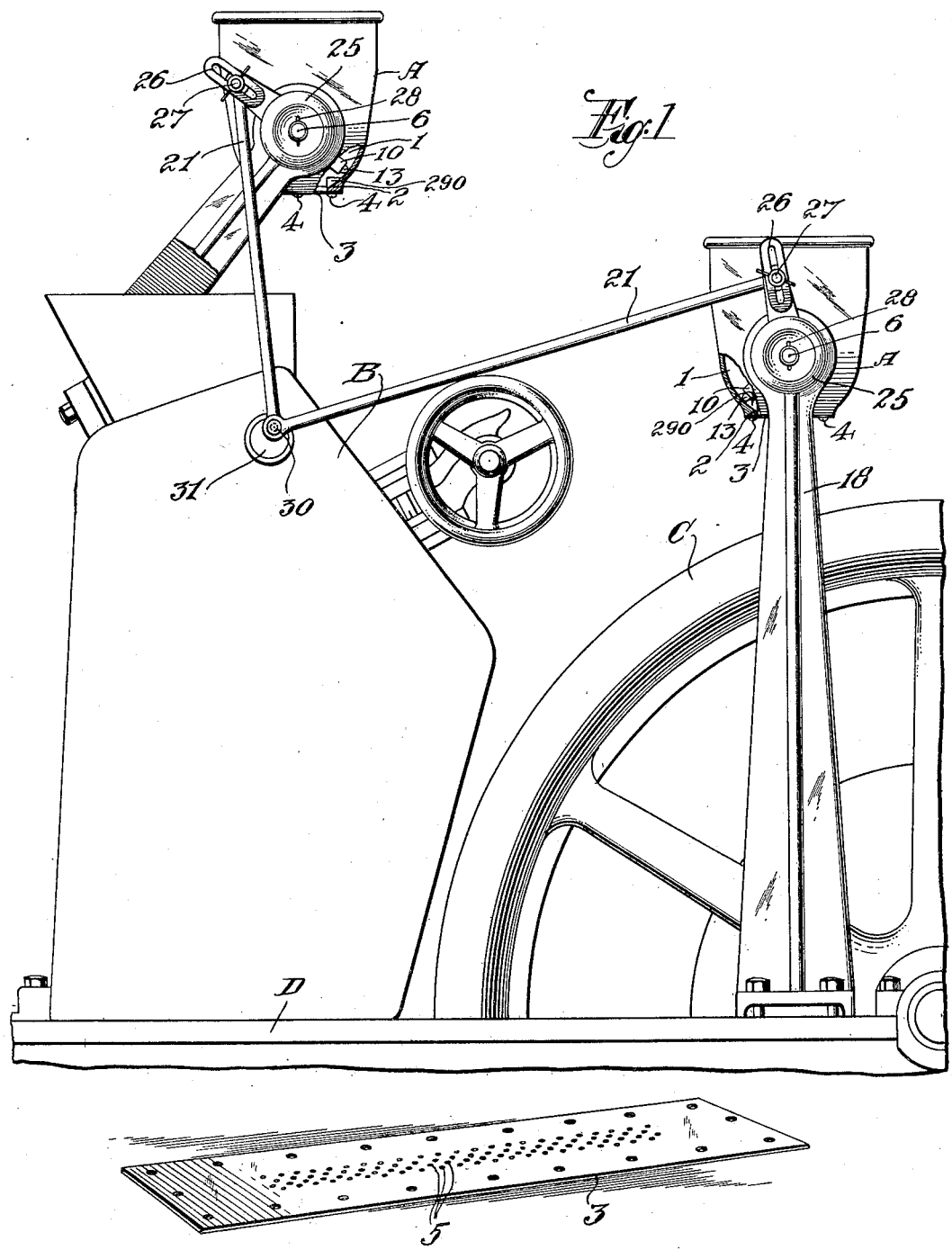

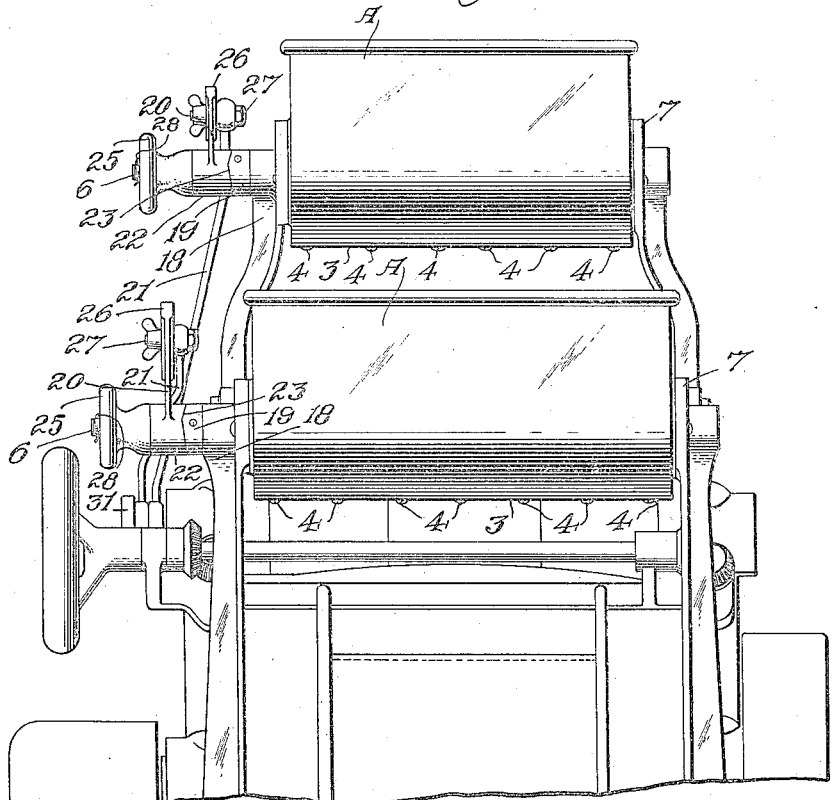
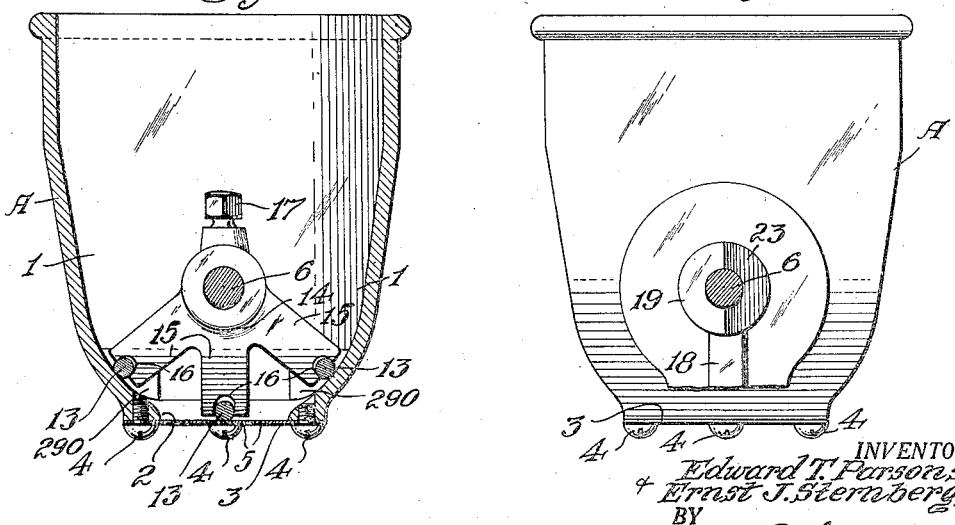

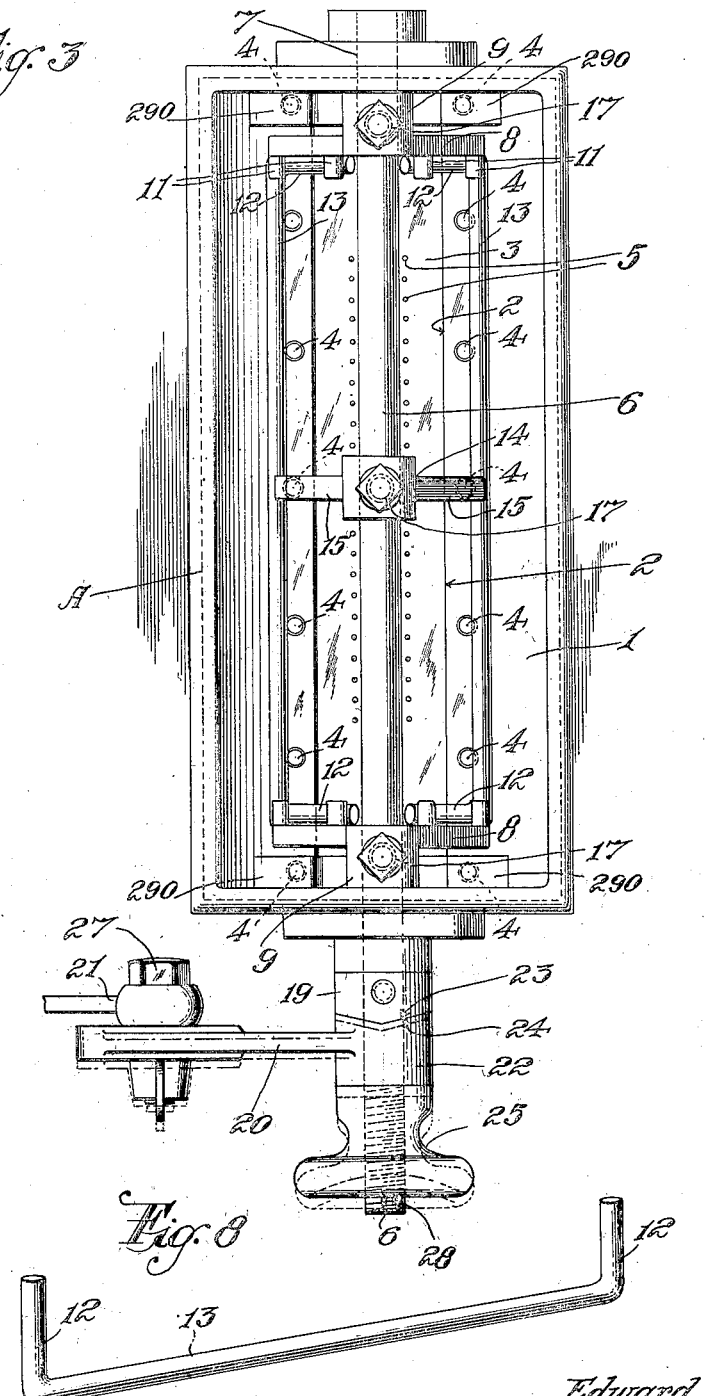

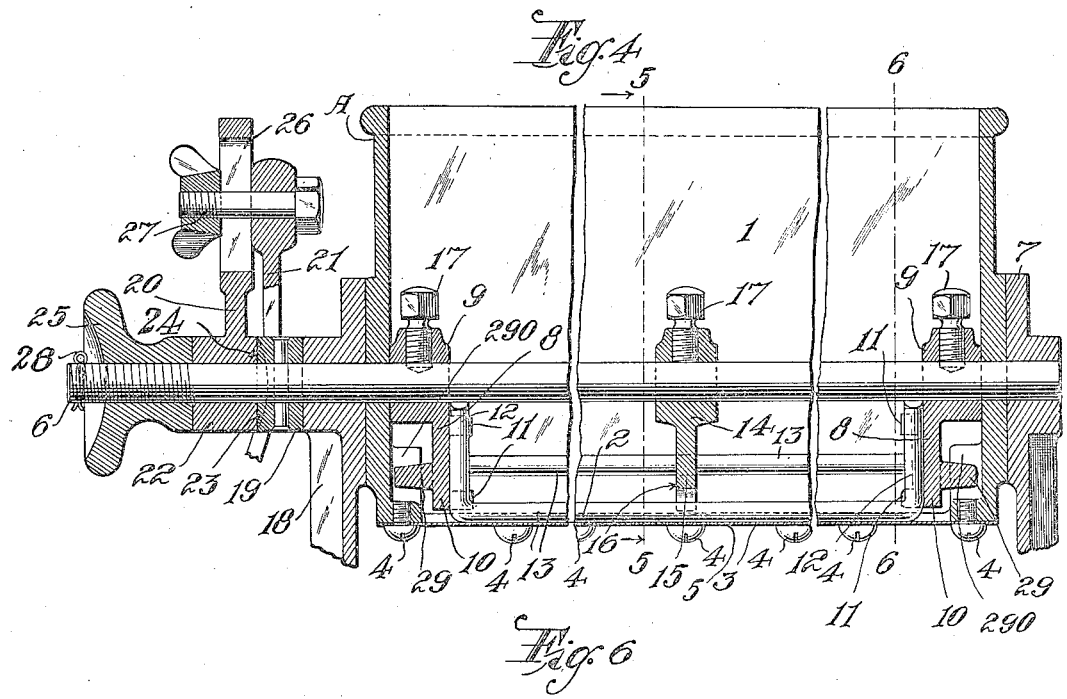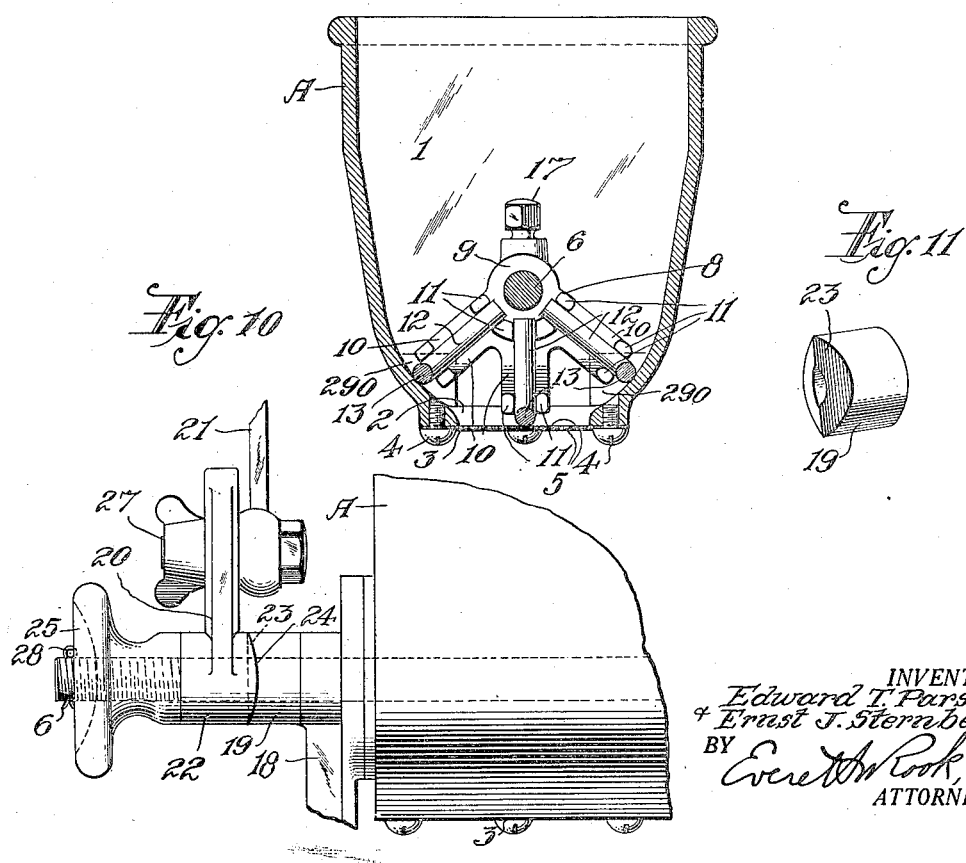

1,548,379

UNITED STATES PATENT OFFICE.

EDWARD T. PARSONS, OF NEWARK, AND ERNST J. STERNBERG, OF LYONS FARMS, NEW JERSEY, ASSIGNORS TO THOMSON MACHINE COMPANY, A CORPORATION OF NEW JERSEY.

FLOUR DUSTER.

Application filed April 28, 1923. Serial No. 635,199.

*To all whom it may concern:*

Be it known that we, EDWARD T. PARSONS and ERNST J. STERNBERG, both citizens of the United States, and residents, respectively, of Newark, in the county of Essex and State of New Jersey, and Lyons Farms, in the county of Union and State of New Jersey, have invented new and useful Improvements in Flour Dusters, of which the following is a specification.

This invention relates to a flour duster or sifter particularly for use on loaf molding machines for bakeries, although the invention is susceptible of use for many other purposes.

Flour dusters, sprinklers or sifters for loaf molding machines are usually provided with shutters, valves or the like for closing the discharge openings of the flour hoppers or containers to stop the dusting or sprinkling of the flour, both during operation of the machine for various reasons and when the machine is thrown out of operation, and the agitators of the dusters frequently continue to operate and tend to force the flour through said discharge openings while said valves or shutters are in closed position, resulting in the flour becoming packed or clogged in said openings so as to prevent, or to cause imperfect, dusting or sifting when operation is resumed until said openings are cleaned. Also the shutters or valves frequently stick and became difficult to operate and also become dirty after a short period of time. This causes trouble and loss of time, as well as imperfect molding of the dough.

One object of the invention is to overcome these difficulties by providing a machine for dusting or sprinkling flour on dough or on the dough manipulating surfaces of a loaf molding machine embodying novel features of construction whereby the dusting or sprinkling of the flour can be instantaneously stopped without the use of valves, shutters or the like and without possibility of the flour becoming packed or clogged in the discharge openings of the sifter.

Another object is to provide a machine of this character having a novel and improved agitating mechanism in which the agitating rods or arms constantly engage the surface of the flour hopper containing the discharge openings so that the flour is forcibly, positively and uniformly ejected from all of said openings.

Further objects are to provide improved means for regulating the operation of the agitating mechanism to accurately control the discharge of flour from the hopper, and to obtain other results and advantages as may be brought out by the following description.

Referring to the accompanying drawings, in which like numerals of reference indicate the same parts throughout the several views, Figure 1 is an end elevation of two of the flour dusters embodying our invention, showing the same mounted on a modern type of loaf molding machine shown in fragmentary side elevation;

Figure 2 is a side elevation of the flour dusters and molding machine as illustrated in Figure 1;

Figure 3 is an enlarged top plan view of the flour duster;

Figure 4 is an enlarged longitudinal vertical sectional view through the duster;

Figure 5 is a transverse sectional view through the same, taken on the line 5—5 of Fig. 4;

Figure 6 is a view similar to Fig. 5, taken on the line 6—6 of Fig. 4;

Figure 7 is an end elevation of the flour duster with a portion of the clutch mechanism removed;

Figure 8 is a detached perspective view of one of the agitator rods;

Figure 9 is a detached perspective view of the discharge plate of the hopper of the flour duster;

Figure 10 is a fragmentary side elevation of one end of the flour duster and the clutch mechanism, and Figure 11 is a detached perspective view of one of the clutch members.

One essential feature of our invention is the provision of small discharge openings, for instance .055 of an inch in diameter, in a thin sheet of metal, for example .011 of an inch thick, said sheet of metal being secured to and forming one side of the flour duster hopper. We have found that with such a construction the flour from the hopper will not be discharged from the said openings except when the flour is agitated, and thus we provide means for instantaneously stopping the agitating mechanism of the duster whereby the sprinkling or dusting of the flour can be instantaneously stopped without the use of valves, shutters or the like. The said sheet of metal is preferably formed of highly tempered steel and is so hard as not to be cut by an ordinary drill, so that the said plate will withstand the wear incident to constant rubbing thereover of the agitator rods.

In the embodiment of the invention shown on the drawings, the reference character A designates the hopper of the flour duster which may be formed of any suitable material, such as cast iron, and is provided with an open top 1 for charging the hopper, and an opening 2 in the bottom which is closed by a thin sheet of metal 3, such as above described, secured to the hopper by any suitable means such as the screws 4, and formed with a plurality of small discharge openings 5.

A shaft 6 extends longitudinally of the hopper A and is journaled in suitable bearings 7 in the ends of the hopper. Within the hopper and adjacent each end thereof an agitator arm 8 is fixedly secured to the said shaft 6. Said agitator arms are each shown as comprising a hub 9 to fit on the shaft 6 and provided with radially projecting fingers 10 which are spaced circumferentially of the hub and arranged in substantially a common plane transverse of the hub. Each of the fingers 10 is provided on its inner face with a plurality of longitudinally spaced pairs of lugs 11 between which are loosely mounted to slide the angularly bent ends of agitator rods 13 which lie longitudinally upon the bottom of the hopper A. Substantially centrally of the shaft 6 is fixedly secured an agitator rod bracing arm 14, said arm being provided with a plurality of radial fingers 15 arranged in common planes with the corresponding fingers 10 of the arms 9 longitudinally of the hopper, the extremities of said arms 15 being provided with notches 16 to loosely receive the agitator rods 13. All of said agitator arms 9 and 14 may be fixedly secured to the shaft 6 by set screws 17. The said agitator arms are preferably so positioned on the shaft 6 as to normally locate the center agitator rod 13 substantially centrally of the discharge plate 3. With this construction the agitator rods are free to slide relatively to the agitator arms so as to constantly rest upon the bottom of the hopper, and this is particularly advantageous in that the center rod 13 may thereby follow the substantially flat surface of the plate 3.

When the agitating mechanism including the arms 9, 14 and rods 13 is to be power driven, the ends of the shaft 6 are journaled in suitable supports 18, and one end of the shaft is connected to the source of power. For connecting the agitating mechanism to a source of power, a clutch mechanism is utilized comprising a bushing 19 fixedly secured to the shaft 6 and a rocker arm 20 rotatably and longitudinally movably mounted on said shaft and connected by means of a link 21 to the driving mechanism. The rocker arm 20 is formed with a hub 22, and the adjacent faces of said hub and bushing 19 are formed with cooperating diametric V-shaped projections and recesses 23 and 24 respectively; and the outer end of the shaft 6 has threaded thereon a knob nut 25 for forcing the hub of the rocker arm into engagement with the bushing 19 with said projections in engagement with said recesses, as clearly shown in Figures 3 and 4 of the drawing. When said projections and recesses are in engagement, oscillation of the rocker arm 20 will cause oscillation of the shaft 6 and the agitating mechanism. For instantaneously stopping the motion of the agitating mechanism, the knob nut 25 is unscrewed away from the hub 22 of the rocker arm, whereupon oscillation of said arm causes the inclined sides of the projections to ride upon the inclined sides of the recesses and force the rocker arm out of engagement with the bushing, as clearly shown in dot and dash lines on Figure 3 and and in Figure 10. It will be noted that the agitating mechanism will always be stopped with the agitator rods 13 in proper relation to the discharge openings 5. The oscillation of the rocker arm is always such that the relative movement of the projections and recesse is always less than the width thereof, so that proper engagement of said projections and recesses is always ensured when the knob nut 25 is screwed up to start operation of the agitating mechanism.

In the operation of the duster, when the agitator rods are actuated with rubbing contact over the plate 3, the flour is forcibly, positively and uniformly ejected through the discharge openings 5, and when motion of the agitator rods is stopped the discharge of flour instantaneously ceases and without any possibility of the flour becoming clogged in said openings. This is due to the fact that the openings 5 are too small to permit the flour to fall by gravity through said openings, and that there is no shutter or valve or motion of the agitator rods tending to force the flour through the openings against such shutter or valve. Furthermore, the walls of the openings 5 due to the thin plate 3 are too short to provide a sufficient surface for the flour to adhere to, even should the flour become moist or lumpy.

For the purpose of regulating the amount of flour discharged through the openings 5, the rocker arm 20 is preferably provided with a longitudinal slot 26 in which is mounted a pin or bolt 27 to which is connected one end of the link 21, the other end of which is connected to the driving mechanism. By adjusting the position of the bolt 27 in the slot 26 the extent of oscillation on the rocker arm is regulated, and thereby the extent of motion of the agitator rods 13 over the plate 4, is regulated. To increase the amount of flour discharged, the bolt 27 is placed at the inner end of the slot, whereby the rods 13 travel over a larger portion of the bottom of the hopper, while to decrease the discharge of flour the bolt 27 is placed at the outer end of the slot, thereby decreasing the extent of travel of the rods 13 over the bottom of the hopper.

The outer end of the shaft 6 is provided with a cotter-pin 28 to prevent the nut 25 from working off the shaft due to vibration of the machine while the duster is out of operation, and the arms 9 are formed with lugs 29 movable between fixed stops 290 on the bottom of the hopper to prevent the agitating mechanism from being turned completely over should said nut 25 accidentally engage the cotter pin 28 when loosening the nut.

Where the invention is to be used in connection with a loaf molding machine, one hopper is placed over the sheeting mechanism B for the dough and another hopper is placed transversely of the molding drum C, said hoppers being supported on the brackets 18 which are secured to the frame D of the machine. One end of the link 21 is then connected to a wrist pin 30 eccentrically mounted on one end of one of the shafts 31 of the sheeting mechanism B. Rotation of the shaft 31 then causes the necessary oscillation of the rocker arms 20.

While we have shown and described a flour duster embodying certain preferred details of construction, it will be understood that this is mainly for the purpose of illustrating the principles of the invention, and that many modifications and changes can be made in the construction without departing from the spirit or scope of the invention. Therefore, we do not desire to be understood as limiting ourselves, except as required by the following claims when construed in the light of the prior art.

Having thus described the invention, what we claim is:

1. A machine of the character described comprising a hopper having discharge openings in the wall thereof, agitator members, an actuating shaft mounted in said hopper, and agitator arms spaced longitudinally of said shaft and projecting radially therefrom and formed on their adjacent faces with spaced lugs to loosely receive said agitator members between them to permit said rods to slide relatively to said arms and freely and automatically follow and maintain contact with the inner sides of the wall of said hopper.

2. A machine of the character described comprising a hopper having discharge openings in the wall thereof, an actuating shaft journaled in said hopper, agitator rods having their ends arranged at substantially right angles thereto, agitator arms spaced longitudinally of said shaft and projecting radially therefrom and formed on their adjacent faces with longitudinally spaced pairs of lugs to slidably receive said end portions of said rods between them to permit said rods to freely and automatically follow and maintain contact with the inner sides of the wall of said hopper.

3. A machine of the character described comprising a hopper adapted to be disposed substantially horizontal and having discharge openings in the bottom thereof, a substantially horizontal shaft journaled in the ends of said hopper, agitator arms spaced longitudinally of said shaft and projecting radially thereof, and agitator rods adapted to slide over the bottom of said hopper with rubbing contact and loosely mounted in said agitator arms to slide longitudinally thereof so as always to be free throughout their paths of movement to constantly rest by action of gravity upon said bottom of the hopper.

4. A machine of the character described, comprising a hopper having a portion of the wall thereof formed of a flat sheet of metal of such a thickness and having openings of such a size as to prevent the discharge of the contents of the hopper except when the same is agitated, a substantially straight agitator rod, an actuating shaft journaled in the hopper, and means for connecting said agitator rod to said shaft to move said rod transversely of said sheet and so that said rod may freely move toward and from said shaft to be throughout its movement over said sheet in rubbing contact with said sheet.

5. A machine of the character described, comprising a hopper having a portion of the wall thereof formed of a flat sheet of metal of such a thickness and having openings of such a size as to prevent the discharge of the contents of the hopper except when the same is agitated, an agitator rod having a substantially straight main portion and its ends disposed at right angles to said main portion, an actuating shaft journaled in said hopper, agitator arms mounted on said shaft and projecting radially therefrom, said arms having on their adjacent faces each a plurality of alined pairs of lugs spaced longitudinally of said arm, one of said end portions of said rod being slidably received between the lugs of each said pairs on each of said arms whereby said rod is moved transversely of said sheet of metal upon oscillation of said shaft and said pairs of lugs guide said rod for movement longitudinally of said arms so that said rod may constantly have throughout its path of movement rubbing contact with said sheet.

6. A machine of the character described, comprising a hopper having a portion of the wall thereof flat and of such a thickness and formed with discharge openings of such a size as to prevent discharge of the contents of the hopper except when the same is agitated, and agitating mechanism within the hopper including a cylindrical rod movable over said bottom of the hopper with a rubbing contact to positively force said contents through said openings.

EDWARD T. PARSONS.
ERNST J. STERNBERG.